US012651293B2

(12) United States Patent
Margolin et al.

(10) Patent No.: US 12,651,293 B2
(45) Date of Patent: Jun. 9, 2026

(54) GRAPH BASED TECHNIQUE FOR AUTOMATICALLY IDENTIFYING A TRANSACTIONS TABLE WITHIN A DOCUMENT

(71) Applicant: INTUIT INC., Mountain View, CA (US)

(72) Inventors: Itay Margolin, Petah Tikva (IL); Ido Joseph Farhi, Azor (IL); Eilon Shitrit, Tel Aviv (IL); Aleksandr Kim, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 260 days.

(21) Appl. No.: 18/680,122

(22) Filed: May 31, 2024

(65) Prior Publication Data

US 2025/0371611 A1     Dec. 4, 2025

(51) Int. Cl.
*G06Q 40/02* (2023.01)
*G06F 40/177* (2020.01)
*G06F 40/279* (2020.01)

(52) U.S. Cl.
CPC ........... *G06Q 40/02* (2013.01); *G06F 40/177* (2020.01); *G06F 40/279* (2020.01)

(58) Field of Classification Search
CPC .................................................... G06Q 40/02
USPC ........................................................ 715/227
See application file for complete search history.

(56) References Cited

U.S. PATENT DOCUMENTS

| | | | | |
|---|---|---|---|---|
| 8,966,454 B1* | 2/2015 | Michelsen | .......... | G06F 11/3636 |
| | | | | 709/224 |
| 9,183,285 B1* | 11/2015 | Brown | .................. | G06F 16/355 |
| 9,799,086 B1* | 10/2017 | Mattson | ................. | G06Q 50/26 |
| 11,232,383 B1* | 1/2022 | Burns, Sr. | .......... | G06Q 10/0637 |
| 11,763,096 B2* | 9/2023 | Tunstall-Pedoe | ... | G06F 16/3329 |
| | | | | 704/9 |
| 12,164,868 B2* | 12/2024 | Tunstall-Pedoe | ... | G06F 16/3344 |
| 2003/0131071 A1* | 7/2003 | Bennett | .................. | G06Q 10/10 |
| | | | | 709/218 |
| 2008/0301040 A1* | 12/2008 | Knudson | ................ | G06Q 40/03 |
| | | | | 705/39 |
| 2014/0222662 A1* | 8/2014 | Bierwas | .................. | G06F 9/541 |
| | | | | 705/39 |
| 2014/0258063 A1* | 9/2014 | Chourasia | .............. | G06Q 40/00 |
| | | | | 705/35 |

(Continued)

*Primary Examiner* — Reza Nabi
(74) *Attorney, Agent, or Firm* — Patterson + Sheridan, LLP

(57) ABSTRACT

A method for automatically identifying a transactions table in a document includes obtaining a document object model of the document. The document object model includes a plurality of nodes and a plurality of edges, with each of the nodes corresponding to a respective element of the document. The method includes generating a plurality of hash values, with each of the plurality of hash values corresponding to a respective node of the plurality of nodes. The method includes determining the document includes a candidate table based on the plurality of hash values. The method includes generating a textual table based on the candidate table. The method includes analyzing one or more columns of the textual table to determine whether the textual table satisfies one or more criteria. The method includes determining the textual table is the transactions table based on determining the textual table satisfies the one or more criteria.

18 Claims, 5 Drawing Sheets

(56)         References Cited

U.S. PATENT DOCUMENTS

| | | | | |
|---|---|---|---|---|
| 2014/0317502 | A1* | 10/2014 | Brown | G06F 9/453 |
| | | | | 715/706 |
| 2015/0121216 | A1* | 4/2015 | Brown | G06N 3/006 |
| | | | | 715/705 |
| 2016/0025499 | A1* | 1/2016 | Moore | H04N 13/271 |
| | | | | 701/1 |
| 2018/0121432 | A1* | 5/2018 | Parson | G06F 16/635 |
| 2019/0333159 | A1* | 10/2019 | Chourasia | G06Q 40/00 |
| 2020/0074515 | A1* | 3/2020 | Ghatage | G06F 40/58 |
| 2021/0157858 | A1* | 5/2021 | Stevens | G06F 40/237 |
| 2024/0338173 | A1* | 10/2024 | Daryanani | G06F 11/324 |
| 2025/0371611 | A1* | 12/2025 | Margolin | G06Q 40/02 |
| 2026/0073432 | A1* | 3/2026 | Burdis | G06Q 30/0282 |

* cited by examiner

FIG. 2

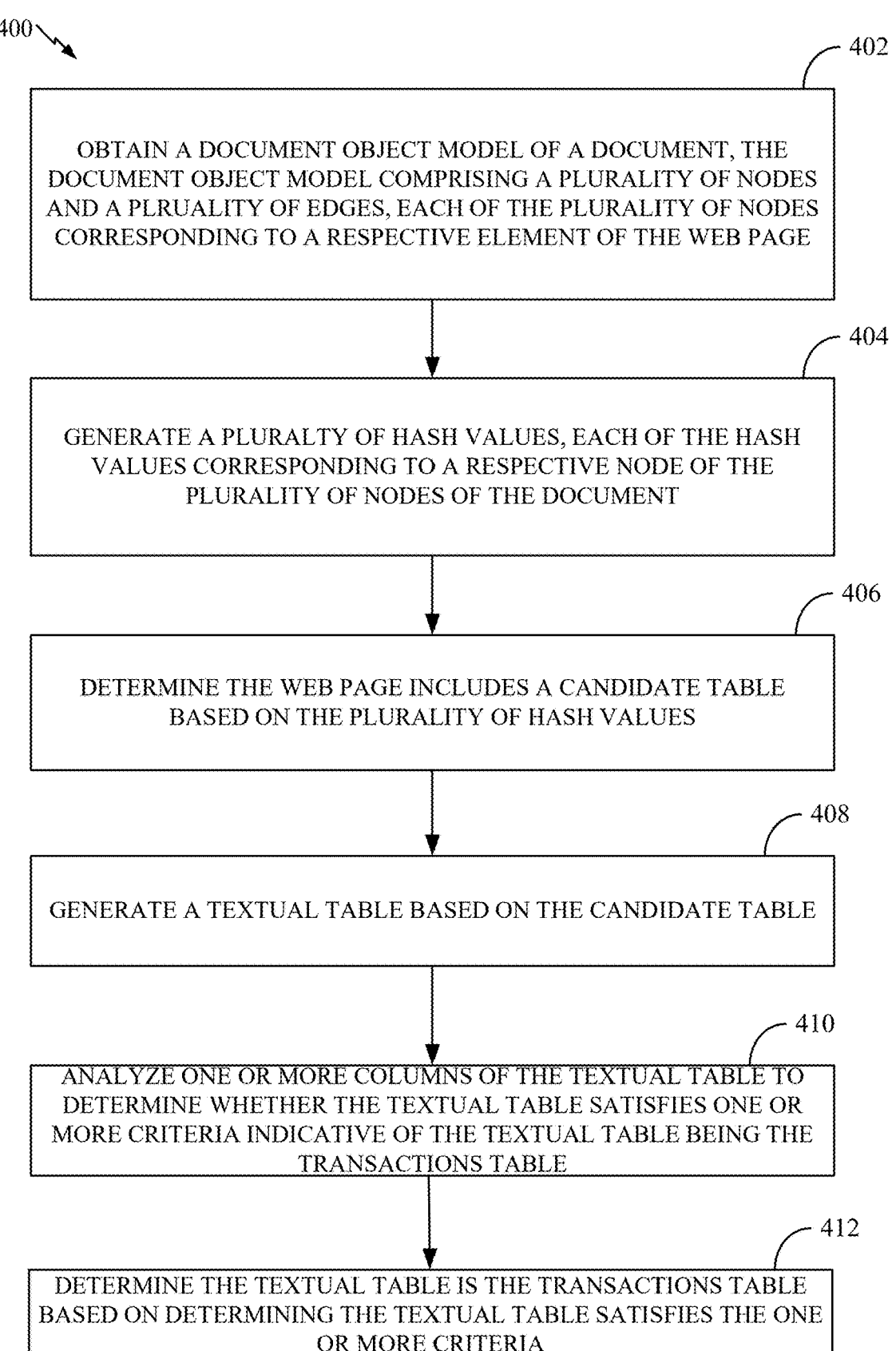

400

402

OBTAIN A DOCUMENT OBJECT MODEL OF A DOCUMENT, THE DOCUMENT OBJECT MODEL COMPRISING A PLURALITY OF NODES AND A PLRUALITY OF EDGES, EACH OF THE PLURALITY OF NODES CORRESPONDING TO A RESPECTIVE ELEMENT OF THE WEB PAGE

404

GENERATE A PLURALTY OF HASH VALUES, EACH OF THE HASH VALUES CORRESPONDING TO A RESPECTIVE NODE OF THE PLURALITY OF NODES OF THE DOCUMENT

406

DETERMINE THE WEB PAGE INCLUDES A CANDIDATE TABLE BASED ON THE PLURALITY OF HASH VALUES

408

GENERATE A TEXTUAL TABLE BASED ON THE CANDIDATE TABLE

410

ANALYZE ONE OR MORE COLUMNS OF THE TEXTUAL TABLE TO DETERMINE WHETHER THE TEXTUAL TABLE SATISFIES ONE OR MORE CRITERIA INDICATIVE OF THE TEXTUAL TABLE BEING THE TRANSACTIONS TABLE

412

DETERMINE THE TEXTUAL TABLE IS THE TRANSACTIONS TABLE BASED ON DETERMINING THE TEXTUAL TABLE SATISFIES THE ONE OR MORE CRITERIA

FIG. 4

GRAPH BASED TECHNIQUE FOR AUTOMATICALLY IDENTIFYING A TRANSACTIONS TABLE WITHIN A DOCUMENT

Aspects of the present disclosure relate to documents that include a transactions table populated with a plurality of different financial transactions. In particular, aspects of the present disclosure relate to a graph based technique for automatically identifying the transactions table.

BACKGROUND

A financial institution (e.g., bank) may, for each of its customers, maintain a log of recent financial transactions (e.g., over the last 30 days). Each financial institution may also host a secure website its respective customers may access to view their unique log of recent financial transactions. For example, a customer of a particular financial institution may enter login credentials (e.g., username and password) at a login page of the website hosted by the particular financial institution. Once logged in, the customer may view the log of recent financial transactions that is specific to the customer. The log of recent financial transactions may be displayed as a table that includes multiple rows and multiple columns, with each of the plurality of rows corresponding to a different financial transaction involving the customer and each of the plurality of columns corresponding to a different attribute (e.g., timestamp, transaction description, etc.) of the recent financial transactions.

Customers of financial institutions may use third-party software applications to automate certain financial tasks, such as bookkeeping. Such software applications may periodically (e.g., once a day) obtain the table of recent financial transactions for each of its users. Some financial institutions provide an application programming interface (API) that allows such software applications to obtain the table. However, most financial institutions do not provide such an API. Thus, such software applications cannot implement a uniform approach for every financial institution. Currently, such software applications must implement multiple approaches for obtaining the table of recent financial transactions to account for inconsistencies amongst the support, if any, the different financial institutions provide for obtaining such information. This results in an inefficient utilization of computing resources.

Accordingly, a need exists for an improved technique for extracting financial transaction data from transactions tables.

BRIEF SUMMARY

Certain embodiments provide a method for automatically identifying a transactions table in a document. The method generally includes: obtaining a document object model (DOM) of the document, the DOM comprising a plurality of nodes and a plurality of edges, each of the plurality of nodes corresponding to a respective element of the document; generating a plurality of hash values, each of the plurality of hash values corresponding to a respective node of the plurality of nodes; determining the document includes a candidate table based on the plurality of hash values; generating a textual table based on the candidate table; analyzing one or more columns of the textual table to determine whether the textual table satisfies one or more criteria; and determining the textual table is the transactions table based on determining the textual table satisfies the one or more criteria.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example document object model of a document according to some aspects of the present disclosure.

FIG. 4 depicts a flow diagram of operations for automatically identifying a transactions table in a document according to some aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
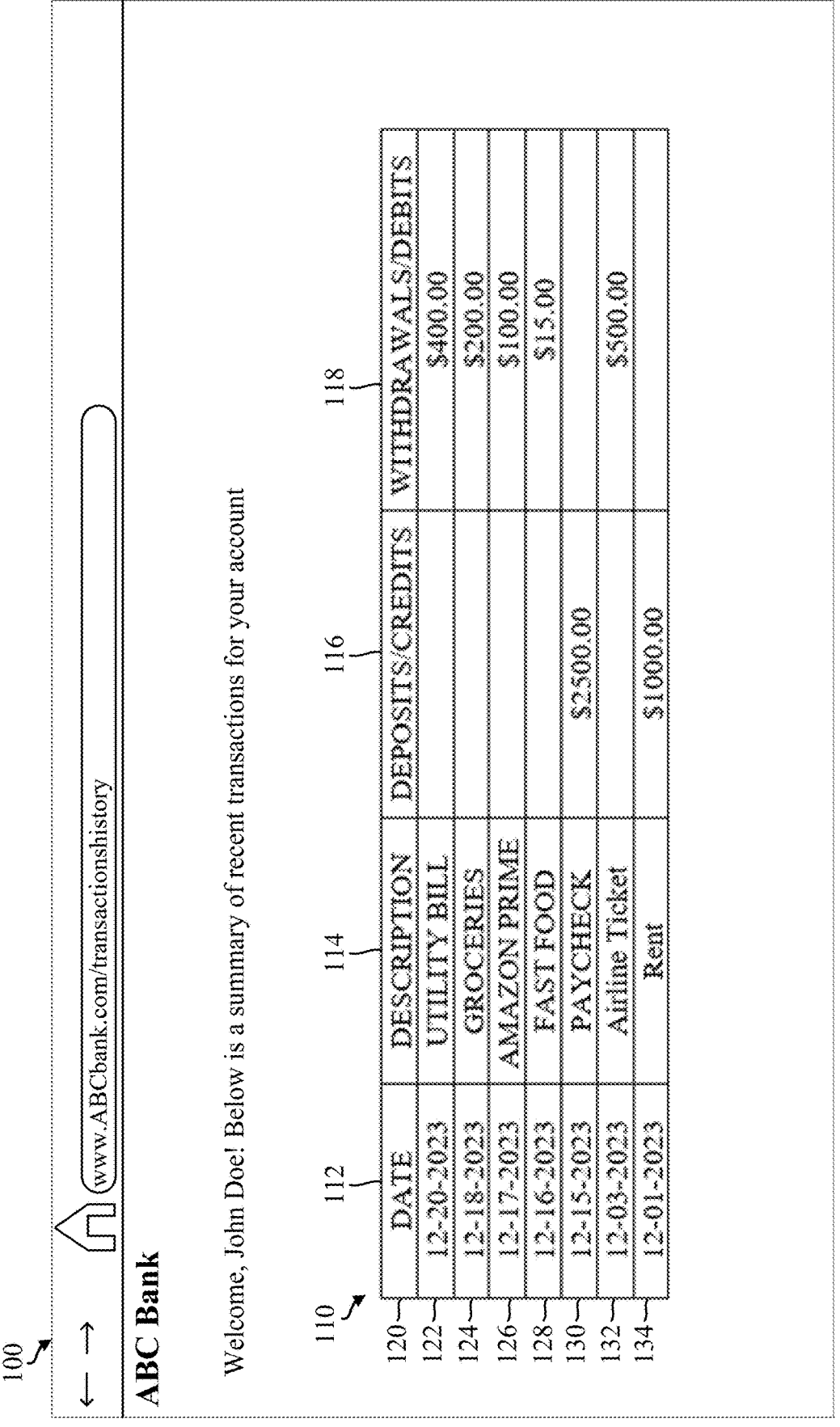
FIG. 1 depicts a document including a transactions table according to some aspects of the present disclosure.

Aspects of the present disclosure provide apparatuses, methods, processing systems, and computer-readable mediums for automatically identifying a transactions table within a source document.

Conventional techniques for extracting data (e.g., financial transactions) from a transactions table included in a document, such as a hypertext markup language (HTML) webpage hosted by a given financial institution, are limited in that there is currently no uniform technique for identifying the transactions table and extracting data therefrom. For instance, data included in a transactions table on a web page hosted by a particular financial institution may be extracted via an application programming interface (API) call, whereas data included in a transactions table on a web page hosted by a different financial institution may not be extracted via an API call. Thus, software applications that extract financial transactions from transactions tables included on such web pages must support a unique script for each web page. Given that there are thousands of different financial institutions, supporting a unique script for every financial institution is not feasible.

Example aspects of the present disclosure are directed to a technique for automatically identifying a transactions table in a document (e.g., web page) such that data included therein may be extracted from the transactions table in the same manner for any given web page. For instance, the disclosed technique may include representing the document graphically. As an example, a HTML web page may be represented as a document object model (DOM). A candidate table may be identified based on the graphical representation (e.g., DOM) of the web page, and the candidate table may be converted into a textual table that includes HTML visible text without attributes (e.g., HTML tags) associated with the HTML web page. The textual table may then be evaluated to determine whether the textual table is a transactions table. For example, one or more columns of the textual column may be evaluated to determine whether data included therein is consistent with the type of data that would be included in a transactions table. As an example, the textual table may be evaluated to determine whether the textual table includes a timestamp column (that is, a column with numbers in a certain format to indicate timestamps for different financial transactions). As another example, the textual table may be evaluated to determine whether the textual table includes a textual column (that is, a column that includes only text) that may be indicative of a transaction description column included in transactions tables. As will be discussed in more detail with reference to FIG. 3, data included in the textual column may be provided to a machine learning model trained using a supervised learning process to classify text as either being a transaction description or not being a transaction description. In this manner, the machine learning model may be used to determine whether the textual table includes the transaction description column that is present in transactions tables. Upon determining the textual table is a transactions table, the software applications may extract data (e.g., financial transactions) from the textual table.

Example aspects of the present disclosure provide numerous technical effects and benefits. For example, the disclosed technique provide a uniform approach for identifying transactions tables in a document. Thus, the disclosed technique allows software applications to extract data from transactions tables on webpages hosted by many different financial institutions without needing to support a unique script for every financial institution. In this manner, the memory of computing devices implementing such software applications may be improved, because the memory no longer needs to store such a large volume of scripts. Furthermore, by determining whether a table included in a document is, in fact, a transactions table before extracting data therefrom, the disclosed techniques minimize (or at least reduce) instances in which software applications extract data from a table included in a document that is not a transactions table. In this manner, the functioning of computing devices implementing such software application is improved (e.g., by avoiding unnecessary and/or inaccurate extractions) because the disclosed techniques minimize (or at least reduce) instances in which data is extracted from a table other than a transactions table.

Example Document Including a Transactions Table

FIG. 1 depicts a document 100 according to some embodiments of the present disclosure. As illustrated, in some embodiments, the document 100 may include a web page hosted by a financial institution (e.g., ABC Bank) and displaying a transactions table 110 that includes multiple financial transactions involving a customer (e.g., John Doe) of the financial institution over a period of time (e.g., last 30 days).

The transactions table 110 may include a plurality of columns, and each of the plurality of columns may correspond to a different attribute of the financial transactions. For example, the transactions table 110 may include a first column 112 corresponding to a first attribute (e.g., date) of the financial transactions and a second column 114 corresponding to a second attribute (e.g., description) of the financial transactions. In addition, the transactions table 110 may include a third column 116 corresponding to a third attribute (e.g., deposit/credits) of the financial transactions and a fourth column 118 corresponding to a fourth attribute (e.g., withdrawals/debits) of the financial transactions.

An initial row 120 of the transactions table 110 may include text denoting the different attributes (e.g., date, description, deposits/credits, withdrawals/debits, etc.) of the financial transactions. Furthermore, each subsequent row 122, 124, 126, 128, 130, 132 of the transactions table 110 may correspond to a different financial transaction involving the customer. For example, row 122 may correspond to a first financial transaction occurring on Dec. 20, 2023 in which $400 were withdrawn from the customer's account (e.g., checking, savings) to pay an expense (e.g., utility bill). As another example, row 128 may correspond to a second financial transaction occurring on Dec. 15, 2023 in which the customer's employer deposited $2500 in the customer's account.

It should be appreciated that the scope of the transactions table 110 is not limited to the attributes illustrated in FIG. 1. In some embodiments, the transactions table 110 may include one or more attributes in addition to the attributes shown in FIG. 1. In alternative embodiments, one or more of the attributes included in the transactions table 110 illustrated in FIG. 1 may be replaced with one or more different attributes.

Example Document Object Model of a Document Including a Table

Figure 2:
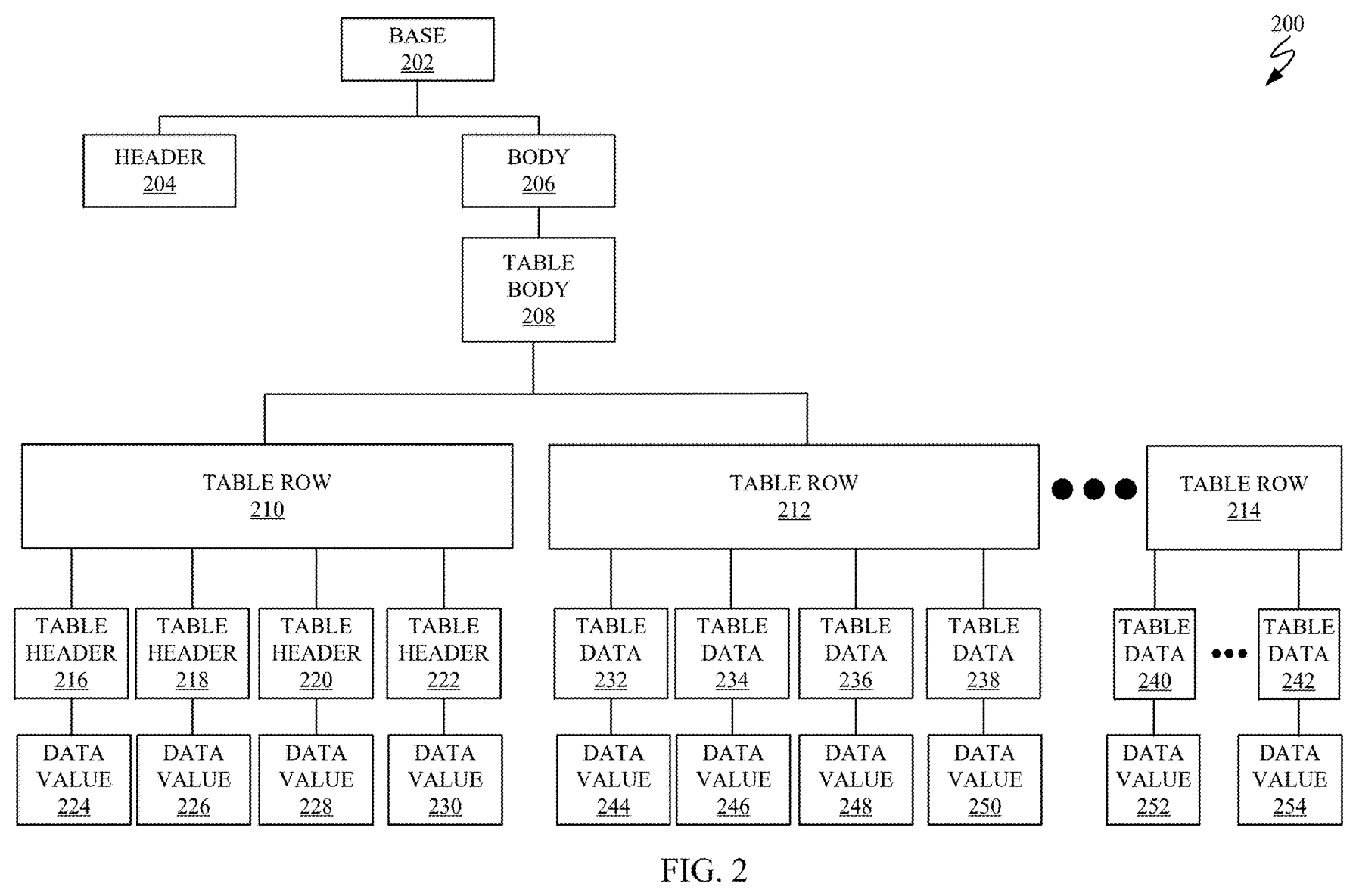

FIG. 2 depicts a document object model 200 of a document that includes a table according to some embodiments of the present disclosure. For example, as illustrated in FIG. 2, the document object model 200 may denote the structure (e.g., HTML structure) of a given document, such as the document 100 discussed above with reference to FIG. 1.

The document object model 200 may include a plurality of nodes (e.g., illustrated as boxes) and a plurality of edges (e.g. illustrated as lines connecting two or more boxes). Each of the plurality of nodes may indicate a different hypertext markup language tag of the document 100. Furthermore, each of the plurality of edges may indicate a relationship between two of the plurality of nodes (e.g., HTML tags).

The plurality of nodes may include a root 202. As illustrated, the root 202 may generally correspond to the document 100 (that is, a HTML webpage) as a whole. The plurality of nodes may further include a header 204 corresponding to a portion (e.g., header) of the document 100 and a body 206 corresponding to a different portion (e.g., body) of the document 100.

Since the document 100 includes the transactions table 110, the plurality of nodes of the document object model 200 may include a table body 208. Furthermore, since the transactions table 110 is included in the body of the document 100, the table body 208 may be connected to the body 206 via an edge to denote the parent/child relationship between the body 206 of the document 100 and the table body 208 that is included in the body 206 of the document 100.

The plurality of nodes of the document object model 200 may further include a plurality of table rows 210, 212, 214. Each of the table rows 210, 212, 214 may correspond to a different row (e.g., initial row 120, subsequent rows 122, 124, 126, 128, 130, 132, 134) of the transactions table 110. Furthermore, each of the table rows 210, 212, 214 may be connected to the table body 208 via an edge to denote the parent/child relationship between the table body 208 and the table rows 210, 212, 214.

The plurality of nodes of the document object model 200 may further include a plurality of table headers 216, 218, 220, 222 (e.g., attributes of financial transactions). Each of the table headers 216, 218, 220, 222 may correspond to a different header (e.g., DATE, DESCRIPTION, DEPOSITS/ CREDITS, WITHDRAWALS/DEBITS) included in the transactions table 110. As illustrated, each of the table headers 216, 218, 220, 222 may be connected to table row 210 via an edge to denote the parent/child relationship between table row 210 and the plurality of table headers 216, 218, 220, 222.

The plurality of nodes of the document object model 200 may further include a plurality of data values 224, 226, 228, 230. Each of the data values 224, 226, 228, 230 may correspond to the text of a different header of the transactions table. For example, data value 224 may include "DATE" to denote a timestamp column of the transactions table 110 and data value 226 may include "DESCRIPTION" to denote a description column of the transactions table 110 that, as illustrated in FIG. 1, includes descriptions for each of the financial transactions included in the transactions table 110. Each of the data values 224, 226, 228, 230 may be connected to a respective table header of the plurality of table headers 216, 218, 220, 222 to denote the parent/child relationship between respective data values and respective table headers.

The plurality of nodes of the document object model 200 may include a plurality of table data 232, 234, 236, 238, 240, 242. As illustrated, table data 232, 234, 236, and 238 may be connected to table row 212 via an edge to denote the parent/child relationship between table row 212 and table data 232, 234, 236, 238. More specifically, table data 232, 234, 236, 238 may denote the different attributes of the financial transaction included in table row 212. Furthermore, table data 240 and 242 may be connected to table row 214 via an edge to denote the parent/child relationship between table row 214 and table data 240, 242.

The plurality of nodes of the document object model 200 may include a plurality of data values 244, 246, 248, 250 connected to table data 232, 234, 236, 238 to denote the parent/child relationship between respective table data and respective data values. For example, data value 244 may be connected to table data 232 via an edge and data value 244 may be connected to table data 234 via a different edge. Furthermore, since table row 212 corresponds to row 122 of the transactions table 110, data value 244 may include the value of the date attribute for a particular financial transaction whose attributes (e.g., date, description, deposits/credits, and withdrawals/debits) that are included in row 122 of the transactions table 110. It should be appreciated that data values 246, 248, and 250 may include values for other attributes of the financial transaction included in row 122 of the transactions table 110.

The plurality of nodes of the document object model 200 may include table data 240 and 242 connected to table row 214 (e.g., row 134 of the transactions table 110) to denote the parent/child relationship between table row 214 and table data 240, 242. The plurality of nodes of the document object model 200 may further include data value 252 and data value 254. Data value 252 may be connected to table data 240 to denote a parent/child relationship between table data 240 and data value 254. Likewise, data value 254 may be connected to table data 242 via an edge to denote the parent/child relationship between table data 242 and data value 254. It should be appreciated that data value 252 may include the value included in the initial column of table row 214, whereas data value 254 may include the value included in the last column of table row 214.

Example System for Automatically Identifying a Transactions Table in a Document

Figure 3:
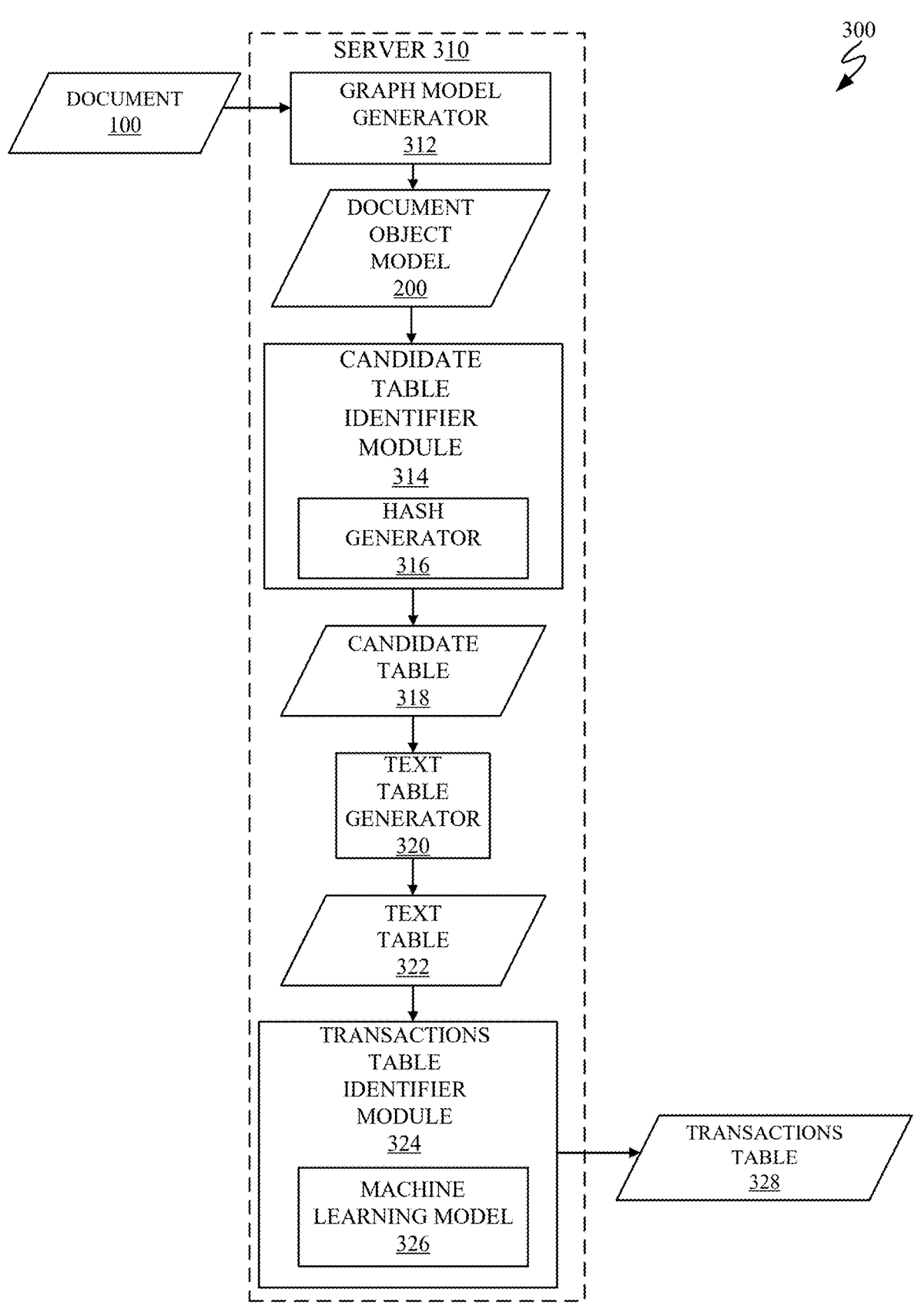
FIG. 3 depicts a system for automatically identifying a transactions table in a document according to some aspects of the present disclosure.

FIG. 3 is a system 300 for automatically identifying a transactions table in a document according to some embodiments of the present disclosure. As shown, the system 300 may include a server 310.

As illustrated, the server 310 may access a document, such as the document 100 discussed above with reference to FIG. 1. The server 310 may include a graph model generator 312. The graph model generator 312 may be configured to generate a graphical representation of a structure of the document 100. For example, the graph model generator 312 may be a function exposed via an application programming interface (API) that, when executed on the document 100, returns the document object model 200 of the document 100.

The server 310 may include a candidate table identifier module 314. The candidate table identifier module 314 may be configured to identify one or more candidate tables based on the document object model 200 of the document 100.

In some embodiments, the candidate table identifier module 314 may include a hash generator 316. The hash generator 316 may be configured to represent each node in the document object model 200 as a hash value. In some embodiments, the hash generator 316 may be configured to generate a concatenated node that includes a parent node and its immediate children (e.g., child nodes directly connected to the parent node). An example of a hash function being applied to such a concatenated node is provided below:

hash(concat([tag type, tag name, child 1 type, child 2 type, . . . ])

where tag type may correspond to table body (e.g., tbody); tag name may correspond to the name of the table if one is provided in source code (e.g., HTML code) for the document; child 1 type may correspond to table row (e.g., trow); and child 2 type may correspond to table row (e.g., trow).

In the above example, the name of the child nodes is excluded from the concatenated node because, in some instances, the name for a given child node may already include the table content (e.g., data value) which would make the hash of the concatenated node different and therefore make it more difficult to identify a table in the document based on the hash of the concatenated node.

The candidate table identifier module 314 may identify a candidate table based on the hash values generated for the different nodes of the document object model 200. For example, if the hash values generated for the different nodes of the document object model 200 includes at least a threshold number (e.g., 5 or more) of identical hash values, then the candidate table identifier module 314 may determine that the document 100 includes a candidate table 318.

The server 310 may include a textual table generator 320. The textual table generator 320 may be configured to convert the candidate table 318 to a textual table 322. In some embodiments, the textual table generator 320 may remove the HTML tags (e.g., tbody, trow, etc.) to generate the textual table 322. In this manner, the textual table 322 may include only the raw data (e.g., text and/or numbers) that are included in the table of the document 100.

The server 310 may include a transactions table identifier module 324. The transactions table identifier module 324 may be configured to determine whether the textual table 322 is a transactions table. For example, the transactions table identifier module 324 may be configured to analyze the textual table to determine whether the textual table 322 includes attributes of a transactions table. For example, the transactions table identifier module 324 may be configured to determine whether the textual table includes a timestamp column that is typically present in transactions tables. More specifically, the transactions table identifier module 324 may be configured to analyze the columns of the textual table 322 to determine whether the textual table 322 includes a column that includes numbers only, which may be indicative of the timestamp column that is typically included in transactions tables.

In some embodiments, the transactions table identifier module 324 may include a machine learning model 326 trained to classify input text as either being descriptive of a financial transaction or not. Labeled training data may be used to train the machine learning model 326 through a supervised learning process. The supervised learning process may include providing training inputs (e.g., different text samples) as inputs to the machine learning model 326. The machine learning model 326 may process the training inputs and output predictions (e.g., an indication of whether or not a given training input is descriptive of a financial transaction). In some embodiments, the output prediction may include a confidence score indicating a level of confidence that the training input (e.g., sample text) falls within the predicted classification (that is, descriptive of a financial transaction or not descriptive of a financial transaction). The predictions are compared to the known labels associated with the training inputs (e.g., a binary label indicating how given sample text has historically been categorized) to determine the accuracy of the machine learning model 326, and parameters of the machine learning model 326 are iteratively adjusted until one or more conditions are met. For instance, the one or more conditions may relate to an objective function (e.g., a cost function or a loss function) for optimizing one or more variables (e.g., model accuracy, model precision, model recall and/or the like). In some embodiments, the conditions may relate to whether the predictions produced by the machine learning model 326 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

In some embodiments, the machine learning model 326 may be a large language model (LLM). It should be appreciated, however, that the scope of the machine learning model 326 within the present disclosure is by no means limited to LLMs and therefore may include other types of machine learning models (e.g., that are trained through supervised learning methods).

The machine learning model 326 (e.g., once trained) may be deployed to the server 310, where it can be used to predict a classification (e.g., a transaction description or not a transaction description) for text included in a column of the textual table 322. In some embodiments, an object is created that stores the machine learning model 326 artifact. For example, the server 310 may be a cloud server or other type of server that can be accessed in order to retrieve the machine learning model 326 (e.g., retrieve the object that includes the model artifact) for use in predicting a classification for given input text from the textual table 322.

In some embodiments, the transactions table identifier module 324 may, as mentioned above, determine a column of the textual table 322 includes only text. For each respective cell of the column, the transactions table identifier module 324 may extract the text included in the respective cell and provide the text as an input to the machine learning model 326. The machine learning model 326 may, as discussed above, classify the text as either being descriptive of a financial transaction or not descriptive of a financial transaction. If a threshold percentage (e.g., at least 80 percent) of the instances of text included in the column of the textual table 322 are classified by the machine learning model 326 as being descriptive of a financial transaction, the transactions table identifier module 324 may determine the textual table 322 is a transactions table and may output the textual table 322 as a transactions table 328.

In some embodiments, the transactions table 328 may be the same as the textual table. In alternative embodiments, the textual table 322 may be modified in response to determining the textual table 322 is a transactions table according to evaluation of one or more of the rules (e.g., presence of timestamp column) and evaluation of output of the machine learning model 326. For instance, the data included in one or more columns of the textual table 322 may be modified. As an example, the format of the data included in one or more columns may be modified to have a uniform format that allows third-party software applications to more easily parse the data.

Example Operations for Automatically Identifying a Transactions Table in a Document FIG. 4 is a flow diagram of example operations 400 for automatically identifying a transactions table in a document (e.g., HTML web page) according to some embodiments of the present disclosure. The operations 400 may be performed by instructions executing on a processor of a server (such as the server 310 of FIG. 3).

Operation 402 includes obtaining a document object model of the document. For example, the document object model may be the document object model illustrated in FIG. 2. More specifically, the document object model may include a plurality nodes and a plurality of edges. Furthermore, each of the plurality of nodes may correspond to a respective element of the document.

Operation 404 includes generating a plurality of hash values, each of the plurality of hash values corresponding to a respective node of the plurality of nodes. In some embodiments, the plurality of nodes may include a parent node a plurality of child nodes that depend directly from the parent node. In such embodiments, generating the plurality of hash values may include concatenating the plurality of child nodes to the parent node to generate a concatenated node and may further include generating a hash value for the concatenated node.

Operation 406 includes determining the document includes a candidate table based on the plurality of hash values. For instance, in some embodiments, determining the document includes a candidate table may include determining the parent node includes a threshold number of identical hash children. The threshold number of identical hash children may indicate a homogeneous horizontal pattern that represents rows in a table.

Operation 408 includes generating a textual table based on the candidate table. In some embodiments, generating the textual table may include modifying the candidate table to remove indicia (e.g., HTML tags) indicative of the different elements included in the document. In this manner, the textual table may include only HTML visible text.

Operation 410 includes analyzing one or more columns of the textual table to determine whether the textual table satisfies one or more criteria indicative of the textual table being the transactions table. For example, in some embodiments, analyzing the one or more columns may include determining whether one of the columns is a timestamp column that includes information (e.g., day, month, year) indicative of a timestamp for financial transactions. Alternatively, or additionally, analyzing one or more columns of the plurality of columns may include removing financial symbols from the textual table to generate an updated textual table and subsequent to the removing, determining whether the updated textual table includes a column comprising only numerical values.

Operation 412 includes determining the textual table is the transactions table based, at least in part, on the analyzing at Operation 410. For example, the textual table may be determined to be the transactions table if the textual table satisfies the one or more criteria (e.g., including a numbers only column) indicative of the textual table being the transactions table.

In some embodiments, analyzing one or more columns of the textual table may include providing text from one or more cells of a plurality of cells of a column of the textual table as an input to a machine learning model (e.g., machine learning model 326 illustrated in FIG. 3) trained using a supervised learning process to classify text as descriptive of a transaction or not descriptive of a transaction. In addition, analyzing one or more columns of the textual table may include obtaining output from the machine learning model that indicates whether the text from the one or more cells of the column is descriptive of a transaction.

In some embodiments, the operations 400 further include extracting one or more transactions from the textual table in response to determining, at operation 412, that the textual table is the transactions table.

Figure 5:
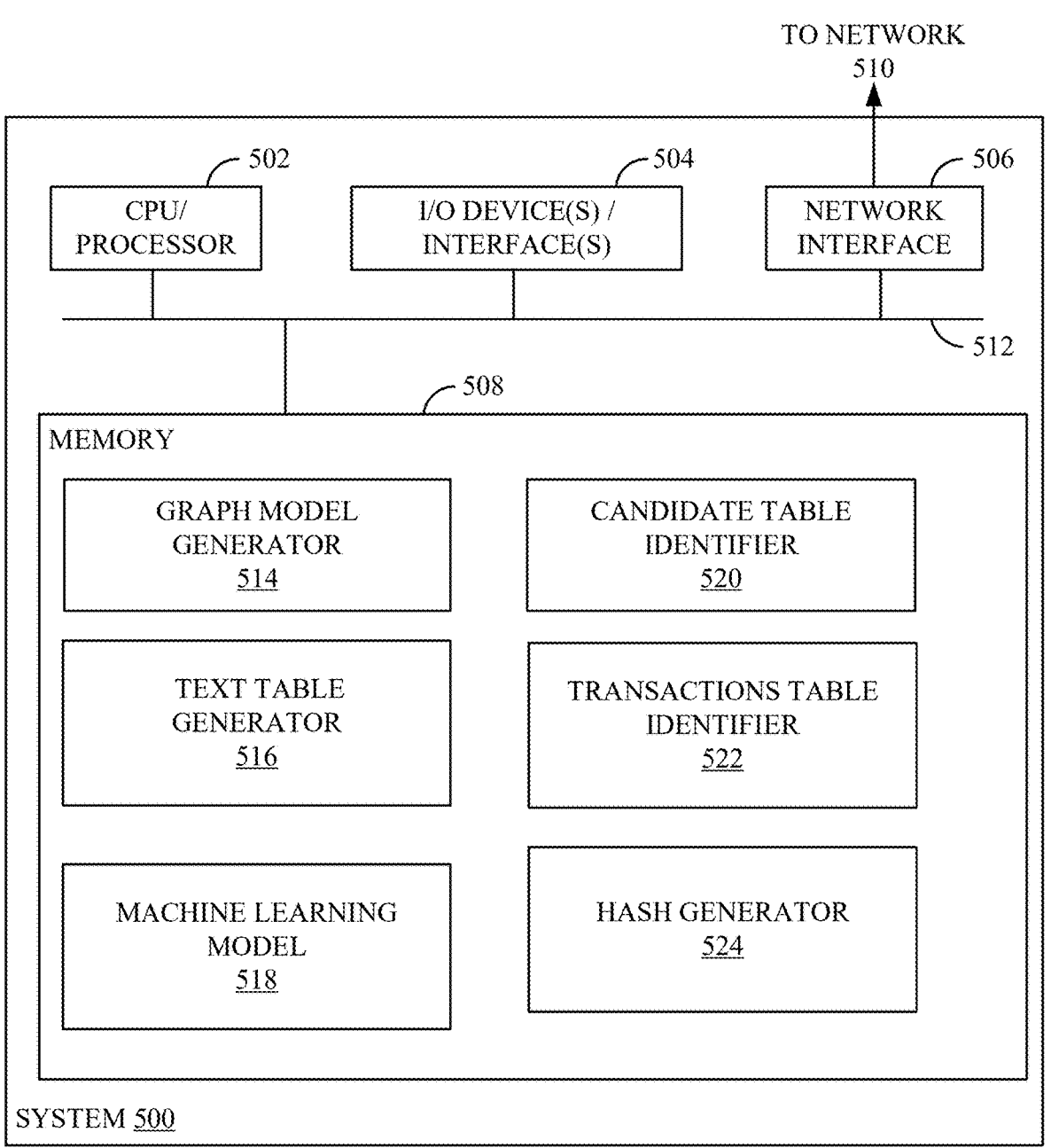
FIG. 5 depicts an example processing system according to some embodiments of the present disclosure.

In some embodiments, the operations 400 may include filtering one or more columns of the textual table to, for example, remove financial symbols from the textual table to generate an updated textual table. In addition, the operations 400 may include determining whether the updated textual table includes a column comprising only numerical values.
Example Computing System FIG. 5 illustrates an example computing system 500 with which embodiments of the disclosure related to automatically recommending navigation actions within a user interface of an application may be implemented. For example, the computing system 500 may be representative of the server 310 of FIG. 3.

The computing system 500 includes a central processing unit (CPU) 502, one or more I/O device interfaces 504 that may allow for the connection of various I/O devices 504 (e.g., keyboards, displays, mouse devices, pen input, etc.) to the computing system 500, a network interface 506, a memory 508, and an interconnect 512. It is contemplated that one or more components of the computing system 500 may be located remotely and accessed via a network 510. It is further contemplated that one or more components of the computing system 500 may include physical components or virtualized components.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508. The CPU 502 is included to be representative of a single CPU, multiple CPUs, a single CPU having multiple processing cores, and other arrangements.

Additionally, the memory 508 is included to be representative of a random access memory or the like. In some embodiments, the memory 508 may include a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, the memory 508 includes graph model generator 514, textual table generator 516, machine learning model 418, candidate table identifier module 520, transactions table identifier module 522, and hash generator 524, which may be representative of graph model generator 312, textual table generator 320, machine learning model 326, candidate table identifier module 314, transactions table identifier module 324, and hash generator 316 of FIG. 3.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically identifying a transactions table in a document, the method comprising:

obtaining a document object model (DOM) of the document, the DOM comprising a plurality of nodes and a plurality of edges, each of the plurality of nodes corresponding to a respective element of the document;

generating a plurality of hash values, each of the plurality of hash values corresponding to a respective node of the plurality of nodes;

determining the document includes a candidate table based on the plurality of hash values;

generating a textual table based on the candidate table;

analyzing one or more columns of a plurality of columns of the textual table to determine whether the textual table satisfies one or more criteria, wherein the analyzing the one or more columns of the plurality of columns comprises:

providing text from one or more cells of a plurality of cells of a column of the textual table as an input to a machine learning model trained using a supervised learning process to classify text as descriptive of a transaction or not descriptive of a transaction; and obtaining an output from the machine learning model, the output indicating the text from the one or more cells of the column is descriptive of a transaction; and determining the textual table is the transactions table based on determining the textual table satisfies the one or more criteria.

2. The method of claim 1, wherein:

the plurality of nodes comprises a parent node and a plurality of child nodes that depend directly from the parent node; and generating the plurality of hash values comprises:

concatenating the plurality of child nodes to the parent node to generate a concatenated node; and generating a hash value for the concatenated node.

3. The method of claim 2, wherein determining the document includes a candidate table based on the plurality of hash values comprises determining the parent node has a threshold number of identical hash children.

4. The method of claim 1, wherein analyzing the one or more columns comprises determining whether the one or more columns comprises a timestamp column.

5. The method of claim 1, wherein analyzing one or more columns of the plurality of columns comprises:

removing financial symbols from the textual table to generate an updated textual table; and subsequent to the removing, determining whether the updated textual table includes a column comprising only numerical values.

6. The method of claim 1, wherein the machine learning model comprises a large language model (LLM).

7. The method of claim 1, further comprising:

prior to the analyzing, filtering the textual table to remove one or more financial symbols included in one or more columns of the textual table.

8. The method of claim 1, further comprising:

in response to determining the textual table is the transactions table, extracting one or more transactions included in the transactions table.

9. The method of claim 1, wherein the document comprises a web page.

10. A system for automatically identifying a transactions table in a document, the system comprising:

a memory including computer executable instructions; and a processor configured to execute the computer executable instructions and cause the system to:

obtain a document object model (DOM) of the document, the DOM comprising a plurality of nodes and a plurality of edges, each of the plurality of nodes corresponding to a respective element of the document;

generate a plurality of hash values, each of the plurality of hash values corresponding to a respective node of the plurality of nodes;

determine the document includes a candidate table based on the plurality of hash values;

generate a textual table based on the candidate table;

analyze one or more columns of a plurality of columns of the textual table to determine whether the textual table satisfies one or more criteria, wherein the analyzing the one or more columns of the plurality of columns comprises:

providing text from one or more cells of a plurality of cells of a column of the textual table as an input to a machine learning model trained using a supervised learning process to classify text as descriptive of a transaction or not descriptive of a transaction; and obtaining an output from the machine learning model, the output indicating the text from the one or more cells of the column is descriptive of a transaction; and determine the textual table is the transactions table based on determining the textual table satisfies the one or more criteria.

11. The system of claim 10, wherein:

the plurality of nodes comprises a parent node and a plurality of child nodes that depend directly from the parent node; and to generate the plurality of hash values, the processor is configured to execute the computer executable instructions to cause the system to:

concatenate the plurality of child nodes to the parent node to generate a concatenated node; and generate a hash value for the concatenated node.

12. The system of claim 11, wherein to determine the document includes a candidate table based on the plurality of hash values, the processor is configured to execute the computer executable instructions to cause the system to:

determine the parent node has a threshold number of identical hash children.

13. The system of claim 10, wherein to analyze the one or more columns of the plurality of columns, the processor is configured to execute the computer executable instructions to cause the system to determine whether the one or more columns comprises a timestamp column.

14. The system of claim 10, wherein to analyze the one or more columns of the plurality of columns, the processor is configured to execute the computer executable instructions to cause the system to:

remove financial symbols from the textual table to generate an updated textual table; and subsequent to the removing, determining whether the updated textual table includes a column comprising only numerical values.

15. The system of claim 10, wherein the machine learning model comprises a large language model (LLM).

16. The system of claim 10, wherein the processor is configured to execute the computer executable instructions to cause the system to:

prior to the analyzing, filter the textual table to remove one or more financial symbols included in one or more columns of the textual table.

17. The system of claim 10, wherein the processor is configured to execute the computer executable instructions to cause the system to:

in response to determining the textual table is the transactions table, extract one or more transactions included in the transactions table.

18. A non-transitory computer-readable medium comprising instructions to be executed in a computer system to automatically identify a transactions table in a document, wherein the instructions when executed in the computer system cause the computer system to:

obtain a document object model (DOM) of the document, the DOM comprising a plurality of nodes and a plurality of edges, each of the plurality of nodes corresponding to a respective element of the document;

generate a plurality of hash values, each of the plurality of hash values corresponding to a respective node of the plurality of nodes;

determine the document includes a candidate table based on the plurality of hash values;

generate a textual table based on the candidate table;

analyze one or more columns of a plurality of columns of the textual table to determine whether the textual table satisfies one or more criteria, wherein the analyzing the one or more columns of the plurality of columns comprises:

providing text from one or more cells of a plurality of cells of a column of the textual table as an input to a machine learning model trained using a supervised learning process to classify text as descriptive of a transaction or not descriptive of a transaction; and obtaining an output from the machine learning model, the output indicating the text from the one or more cells of the column is descriptive of a transaction; and determine the textual table is the transactions table based on determining the textual table satisfies the one or more criteria.

\* \* \* \* \*